Oct. 24, 1950     W. J. HEINRICH     2,527,219
LEAKPROOF JOINT
Filed Sept. 15, 1944
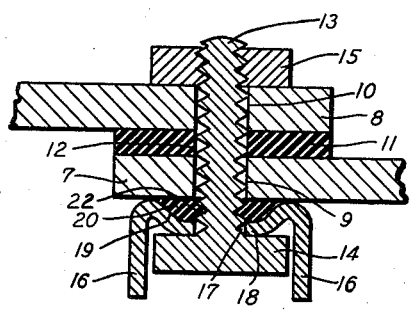
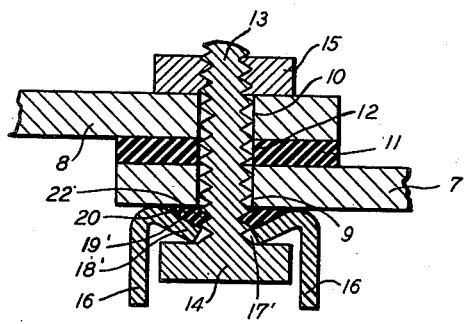
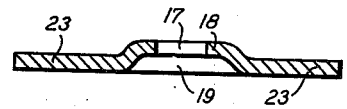
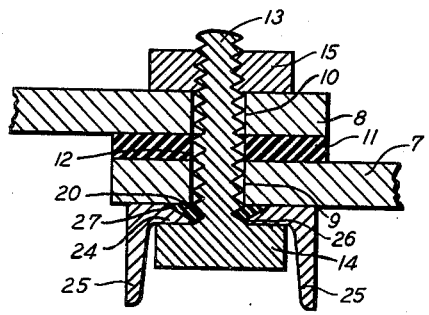
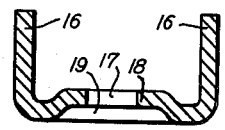
Inventor
WILLIAM J. HEINRICH
By Alfred R. Fuchs
Attorney Patented Oct. 24, 1950

2,527,219

UNITED STATES PATENT OFFICE 2,527,219

LEAKPROOF JOINT

William J. Heinrich, Englewood, Mo., assignor to Andrew A. Kramer, Kansas City, Mo.; Joseph M. Kramer and Helen Kramer Biersmith executors of Andrew A. Kramer, deceased Application September 15, 1944, Serial No. 554,236

3 Claims. (Cl. 85—1)

My invention relates to leak proof joints, and more particularly to a leak proof seam or joint in a fluid tight receptacle, such as a tank. Fluid is used in the sense of either a liquid or a gas or both. It is particularly adapted for use in the joints or seams in the side walls and decks or roofs of tanks. While nuts have been provided in tank constructions that have been recessed so as to prevent leakage of a fluid between a sheet and a threaded fastening element and a nut, as in the patent to Buchanan, No. 1,515,996, patented November 18, 1924, on Tank Construction, and while cupped washers have been used in conjunction with plain nuts to obtain the equivalent of the recess in the nut of the aforementioned Buchanan patent, both of these methods of reducing or preventing leakage have entailed the use of a large number of small special parts, which easily become lost, and in the case of the cupped washer, require the use of an extra element. Furthermore it is particularly desirable in the case of tank decks to avoid having any flanged members projecting from the top surface of the deck or roof, as the presence of such flanged members frequently causes workers walking over the roof to trip, resulting in injuries. It has accordingly become customary to provide the channels that are ordinarily provided for preventing the bolts from turning when the nuts are applied thereto on the inner side of the seam to avoid the presence of such a flanged member on the top surface thereof.

It is a purpose of my invention to provide means for making a leak proof joint around the shank of a bolt on the inside of the seam or joint in a tank, to thus prevent any leakage around the shank of the bolt through the bolt holes to the outer surface of the tank, and to further provide such means in conjunction with the bolt holding channel so that the ordinary bolt without any special nut and without the use of any special washer can be utilized in securing together the overlapping sheets or sections of the desk, or other wall portion of a tank, or similar receptacle, that must be liquid or fluid tight.

In order to accomplish this purpose I provide a recess on the unflanged face or side of the bolt holding channel member, or similar flanged member, for holding the bolts from turning. This provides a chamber or recess between the sheet adjacent which the bolt holding channel lies in face to face relation and said channel member, in which a compressible or distortable gasket member can be provided, which, under compression, will fill the recess or chamber so provided and enter the screw-threads of the bolt-like member, so as to seal one or more turns thereof and prevent any escape of fluid through the spiral passage provided by said threads.

My invention can be applied to rolled channels, or to channels that are formed out of sheet metal, and in the case of a sheet metal channel, my invention comprises a new and improved method of making such a channel. While channel members are herein referred to as bolt holding members, or members for holding the bolts from turning, the invention is applicable to any member for holding a threaded element that has a polygonal head from turning, which is interposed between said head and the adjacent sheet, or which has a portion interposed therebetween.

One of the advantages of my invention is that the gasket means provided not only provides a leak proof joint without the use of any additional parts or specially made small parts, but also helps to hold the bolts in position after the same are projected through the various openings and before the nuts are applied thereto. In assembling sections of tank decks and similar devices, it is customary to assemble these in an inverted position, that is, with the top side down. The bolts are passed through the openings in the channel members, the openings in the gasket members seated in the recesses, the openings in one sheet, the openings in the gasket between the sheets, and the openings in the other sheet, all the bolts being first inserted in the holes before the two sections are inverted and the nuts applied. While the gasket members between the sheets previously served to some extent to hold bolts from falling out of the holes, the sealing means for preventing leakage additionally serve this purpose, and there is very little likelihood of the bolts falling out of position before the nuts are applied thereto by the use of my improved sealing means.

Other objects and advantages of my invention will appear as the description of the drawings proceeds. I desire to have it understood, however, that I do not intend to limit myself to the particular details shown or described, except as defined in the claims.

In the drawings:

Fig. 1 is a fragmentary sectional view on a somewhat enlarged scale, of a joint or seam utilizing one form of my invention to make the same leak proof.

Fig. 2 is a similar section of a modification.

Fig. 3 is a similar section of a further modification.

Fig. 4 is a section through a blank that has been partly formed in making one of my sheet metal bolt holding channel members.

Fig. 5 is a view thereof after the flanges have been turned up thereon, and

Fig. 6 is a perspective view of one of the gasket members.

Referring in detail to the drawings, in Fig. 1 is shown a joint or seam in a receptacle, such as a tank, the particular joint or seam shown being that in a tank roof or deck. The deck sections 7 and 8 made of sheet metal have their edges overlapping as shown, the underlapping sheet 7 having a row of openings 9 therein parallel to the edge thereof, and the overlapping sheet 8 having a row of openings 10 parallel to the edge thereof, the openings 9 and 10 aligning with each other. Between the sections 7 and 8 a gasket member 11 is provided, which is made in the form of a strip running lengthwise of the joint or seam, and is of a compressible material, such as "Neoprene," or other similar rubber substitute that is not affected by oil, gasoline, or similar liquids. The gasket member 11 is provided with a row of openings 12 therein, which align with the openings 9 and 10. Extending through the openings is a bolt or similar headed threaded fastening member having the threaded shank portion 13 and a polygonal head 14. The usual nut 15 cooperates with the threaded shank 13 to clamp the parts together. The construction thus far described is substantially standard.

Means is provided for preventing the bolts from turning when the nuts are applied thereto, comprising a channel member having the flanges 16, which are engaged by the flat faces on the polygonal head of the bolt to prevent the turning of the bolt when the nut 15 is applied thereto and tightened up. In order to prevent leakage from the interior of the vessel or tank provided with the roof, deck, or other wall portion, to which my invention is applied, recesses are provided in the face of the web portion of the channel opposite that having the flanges 16 extending therefrom, which are of an annular character and surround the bolt openings 17 in said web portion. The channel, of course, extends lengthwise of the joint or seam, and there is a row of openings 17 therein aligning with the openings 9, 10 and 12. The channel member is, preferably, provided with annular offset portions 18 therein forming the sockets or recesses 19 in the face thereof opposite that having the flanges 16 projecting therefrom, in which the gasket members, such as the gasket member 20 shown in Fig. 6, are placed when the parts are assembled.

In the assembly of the deck or roof sections, such as the sections 7 and 8, these are placed in a position the inverse of that shown in Fig. 1. The gasket 11 is placed on top of the section 8 and the section 7 placed on top of the gasket, after which the channel, with which the gaskets 20 have been assembled within the row of sockets or recesses 19, is placed in position along the seam on top of the section 7. The bolt is then inserted through the openings in the various parts, the gasket having an opening 21 through which said bolt is inserted, all the bolts being placed in the row of openings before the sections are inverted and the nuts 15 applied thereto.

When the nuts 15 are applied to the threaded shanks 13 of the bolts the gaskets 11 are compressed and the gaskets 20 are compressed. Not only are the gaskets 20 compressed because of the drawing together of the parts and the relative size of the gasket member and the socket in which it is placed, but the offset 18 is somewhat flattened due to the pressure of the head 14 of the bolt thereon, further compressing the gasket 20. Under the action of the pressure created, the gasket fills the entire recess or chamber between the sheet or section 7 and the channel member having the recesses 19 therein, and is forced into the threads on the shank 13 of the bolt, as shown at 22 in Fig. 1. One or more of said threads may be filled with the gasket material in this manner, thus providing a complete seal against escape of any fluid through the spiral passage provided by the threads. Furthermore in the assembly of the parts the gaskets 20 in cooperation with the various bolts placed in the openings in the channel member and in the other overlapping parts, will help to hold the bolts in position and prevent the individual bolts from falling out of place so that the same will be in properly projected position for engagement of the nuts therewith when the sections are inverted and the nuts are to be applied thereto. It will be noted that the socket member 19 formed by means of the annular offset 18 in the channel member 16 is provided with a compoundly curved wall portion so as to form a correspondingly shaped socket.

Instead of providing a socket or recess of the shape shown in Fig. 1, the arrangement shown in Fig. 2 can be utilized and substantially the same results obtained. Inasmuch as the sheets that are overlapped to form the seam or joint, the gasket member between the sheets, the bolt and the nut, are the same as shown in Fig. 1, the same reference numerals are applied thereto and to the openings therein. The channel member is provided with flanges 16 as previously described, but the web portion thereof is provided with offsets therein that are of an annular character, but have inclined walls so as to provide a substantially conical offset 18' surrounding each of the bolt receiving holes 17', thus forming a substantially conical socket 19' that receives the gasket 20 in a similar manner to that previously described. Upon the nut 15 being tightened up, the gasket material will fill the chamber or socket thus provided and the threads as shown at 22 in Fig. 2, thus accomplishing the same results as in the previously described form of the invention shown in Fig. 1.

The channel shown in Fig. 1 is, preferably, made of sheet metal, by first punching the openings 17 therein and at the same time offsetting the portion 18 providing the recess or socket 19. The opening 17 and the offset portions 18 can be formed for the entire strip simultaneously, or one at a time, as may be found preferable. Preferably the opening 17 and the offset 18 are formed in a single operation. The end portions 23 of the strip are then turned up to form the flanges 16 of the channel member.

The channel member shown in Fig. 2 is made in the same manner, except that the die for forming the socket member is of a different shape, so as to form the conical socket instead of one with compoundly curved walls, such as the socket 19.

Instead of providing a sheet metal channel for holding the bolt heads from turning, a rolled channel can be provided, as shown in Fig. 3. Inasmuch as the sheets, bolt and nut, and the gasket material between overlapping edges of the sheets are the same as previously described, the same reference numerals are applied thereto as in the other figures of the drawings. When a rolled channel having the web portion 24 and the flanges 25 is provided, the bolt receiving opening 26 thereof, which aligns with the openings 9, 12 and 10 in the sheet 7, gasket material 11 and sheet 8, respectively, is countersunk, as shown at 27, on the side or face of the channel opposite that having the flanges 25 thereon. A socket is thus provided which receives the gasket member 20 and is of such size relative to said gasket member that when the nut 15 is screwed down on the bolt the gasket material will be distorted in substantially the manner shown in Fig. 3, so as to completely fill the socket thus provided and one or more turns of the threads provided on the shank portion 13 of the screws, so as to prevent the passage of fluid through the spiral passageway provided by the screw-threads and providing a fluid-tight joint between the shank of the bolt and the opening through which the bolt extends. The form of the invention shown in Fig. 3 has the same advantages as the other two forms of the invention shown.

In all of the forms of the invention shown the sealing means provided prevents passage of any fluid from the interior of the container through the bolt hole openings around the screw-threads of the shank of the bolt in a roof or deck of a tank, or similar member, at the entrance to such passage, the gasket material 11 preventing the passage of any fluid between the two sheets at the overlapping portion thereof and to the bolt holes from the interior of the tank at the point where this strip of gasket material is provided. Furthermore in all forms of the invention the gasket members 20 inserted in each of the sockets or recesses provided therefor in the channel member cooperate with the gasket material 11 to hold the bolts in projected position, so that all said bolts can be projected through the openings at a seam or joint in a tank, or similar member, and all the nuts applied thereto at the same time.

What I claim is:

1. In a seam joining overlapping sheets, a row of screw-threaded securing elements having polygonal heads, means having screw-threaded connection therewith to secure said sheets together at said seam, a flanged member underlying the heads of said securing elements to hold said securing elements against turning extending lengthwise of said row and having openings to receive said securing elements therethrough, said flanged member being provided with offsets therein surrounding said openings to provide recesses in the unflanged side thereof surrounding said openings, and sealing members mounted in said recesses.

2. A bolt holding channel having a series of bolt receiving openings therein, said channel having offsets therein surrounding said openings to provide recesses therein on the unflanged side thereof.

3. In a seam joining overlapping sheets, a row of screw-threaded securing elements having polygonal heads, means having screw-threaded connection therewith to secure said sheets together at said seam, a member underlying the heads of said securing elements having means to hold said securing elements against turning extending lengthwise of said row and having openings to receive said securing elements therethrough, said member being provided with offsets therein surrounding said openings to provide recesses in the side thereof remote from said heads surrounding said openings, and sealing means mounted in said recesses.

WILLIAM J. HEINRICH.

REFERENCES CITED

The following references are of record in the file of this patent:

UNITED STATES PATENTS

| Number | Name | Date |
| --- | --- | --- |
| 1,452,238 | Finnigan | Apr. 17, 1923 |
| 1,515,996 | Buchanan | Nov. 18, 1924 |
| 2,097,713 | Ashley | Nov. 2, 1937 |
| 2,123,035 | Ashley | July 5, 1938 |
| 2,159,346 | Welch et al. | May 23, 1939 |